United States Patent
Roth et al.

(10) Patent No.: US 6,986,607 B2
(45) Date of Patent: Jan. 17, 2006

(54) PROTECTIVE COVERS FOR FIBER OPTIC CONNECTOR TO MODULAR PROTECTIVE COVERS FOR FIBER OPTIC CONNECTOR ASSEMBLY

(76) Inventors: Richard F. Roth, 4 Lorden La., Brookline, NH (US) 03033; Joseph J. George, 9 Gilmore La., Amherst, NH (US) 03031; Sepehr Kiani, 15 Palmer St., Watertown, MA (US) 02472; John A. Lehman, 214 Joppa Hill Rd., Bedford, NH (US) 03110; Mark G. Vitello, 136 Boden St., Apt. 209, Lowell, MA (US) 01852

( * ) Notice: Subject to any disclaimer, the term of this patent is extended or adjusted under 35 U.S.C. 154(b) by 67 days.

(21) Appl. No.: 10/672,779

(22) Filed: Sep. 26, 2003

(65) Prior Publication Data

US 2005/0069262 A1 Mar. 31, 2005

(51) Int. Cl.
*G02B 6/38* (2006.01)
*H01R 9/22* (2006.01)

(52) U.S. Cl. .......................... 385/55; 385/73; 439/717
(58) Field of Classification Search .................. 385/55, 385/60, 73, 53, 76; 439/717
See application file for complete search history.

(56) References Cited

U.S. PATENT DOCUMENTS

| | | | |
|---|---|---|---|
| 3,771,104 A | * | 11/1973 | Clark .......................... 439/415 |
| 4,797,123 A | * | 1/1989 | Weber ......................... 439/717 |
| 5,117,528 A | | 6/1992 | Kanayama et al. |
| 5,220,703 A | | 6/1993 | Kanayama et al. |
| 5,259,053 A | | 11/1993 | Schaffer et al. |
| 5,289,554 A | | 2/1994 | Cubukciyan et al. |
| 5,305,408 A | | 4/1994 | Schaffer et al. |
| 5,333,221 A | | 7/1994 | Briggs et al. |
| 5,373,604 A | | 12/1994 | Reuter |
| 5,414,790 A | | 5/1995 | Lee et al. |
| 5,506,922 A | | 4/1996 | Grois et al. |
| 5,574,813 A | | 11/1996 | Chudoba et al. |
| 5,651,834 A | | 7/1997 | Jon et al. |
| 5,712,938 A | | 1/1998 | Lin et al. |
| 5,735,013 A | | 4/1998 | Yaguchi et al. |
| 5,746,611 A | | 5/1998 | Brown et al. |
| 5,748,819 A | | 5/1998 | Szentesi et al. |
| 5,768,738 A | | 6/1998 | Lee |
| 5,825,955 A | | 10/1998 | Ernst et al. |
| 5,836,031 A | | 11/1998 | Cox |
| 5,837,064 A | | 11/1998 | Bowers |
| 5,865,901 A | | 2/1999 | Yin et al. |
| 5,887,098 A | | 3/1999 | Ernst et al. |
| 5,906,686 A | | 5/1999 | McNeil |
| 5,991,960 A | | 11/1999 | Johnson |
| 6,041,155 A | | 3/2000 | Anderson et al. |
| 6,053,985 A | | 4/2000 | Cheswick et al. |
| 6,076,975 A | | 6/2000 | Roth |
| 6,079,881 A | * | 6/2000 | Roth .......................... 385/76 |

(Continued)

OTHER PUBLICATIONS

Brochure—Gel–Pak®, Innovative Solutions for Delicate Devices.

*Primary Examiner*—Chandrika Prasad
(74) *Attorney, Agent, or Firm*—Wolf, Greenfield & Sacks, P.C.

(57) ABSTRACT

An optical interconnection system, particularly useful in a backplane arrangement in an electronic assembly. The interconnection system includes "dual-use" protective covers for protection from damage and/or cleaning within backplane and daughter card style connectors. The protective covers are modular for easy use. Some versions contain adhesive members that can remove contaminates from various portions of the connector assembly. The protective covers can be inserted into a backplane connector of an electronic assembly using a tool or as part of a "dummy board."

33 Claims, 11 Drawing Sheets

U.S. PATENT DOCUMENTS

| | | | |
|---|---|---|---|
| 6,108,482 A | 8/2000 | Roth | |
| 6,146,466 A | 11/2000 | Bowers | |
| 6,178,096 B1 | 1/2001 | Flickinger et al. | |
| 6,188,825 B1 | 2/2001 | Bandy et al. | |
| 6,209,162 B1 | 4/2001 | Chairadin et al. | |
| 6,209,163 B1 | 4/2001 | Clairadin et al. | |
| 6,240,229 B1 | 5/2001 | Roth | |
| 6,357,929 B1 | 3/2002 | Roehrs et al. | |
| 6,361,218 B1 * | 3/2002 | Matasek et al. | 385/60 |
| 6,374,030 B2 | 4/2002 | Krow, Jr. et al. | |
| 6,398,422 B1 | 6/2002 | Szilagyi et al. | |
| 6,415,471 B1 | 7/2002 | Childers et al. | |
| 6,419,566 B1 | 7/2002 | Palmisano | |
| 6,449,795 B1 | 9/2002 | Sato | |
| 6,461,054 B1 * | 10/2002 | Iwase | 385/73 |
| 6,471,413 B1 | 10/2002 | Pattisall | |
| 6,513,989 B1 * | 2/2003 | Bleck et al. | 385/60 |
| 6,524,014 B2 | 2/2003 | Stephenson et al. | |
| 6,530,700 B2 | 3/2003 | Williams | |
| 6,547,450 B2 | 4/2003 | Lampert | |
| 6,550,979 B1 | 4/2003 | Fleenor et al. | |
| 6,572,274 B1 | 6/2003 | Margaliot et al. | |
| 6,652,152 B2 * | 11/2003 | Yang et al. | 385/53 |
| 2004/0105239 A1 * | 6/2004 | Chiang | 361/728 |

\* cited by examiner

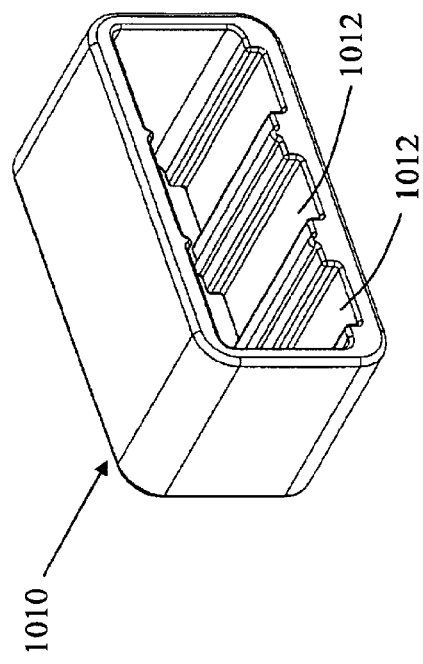
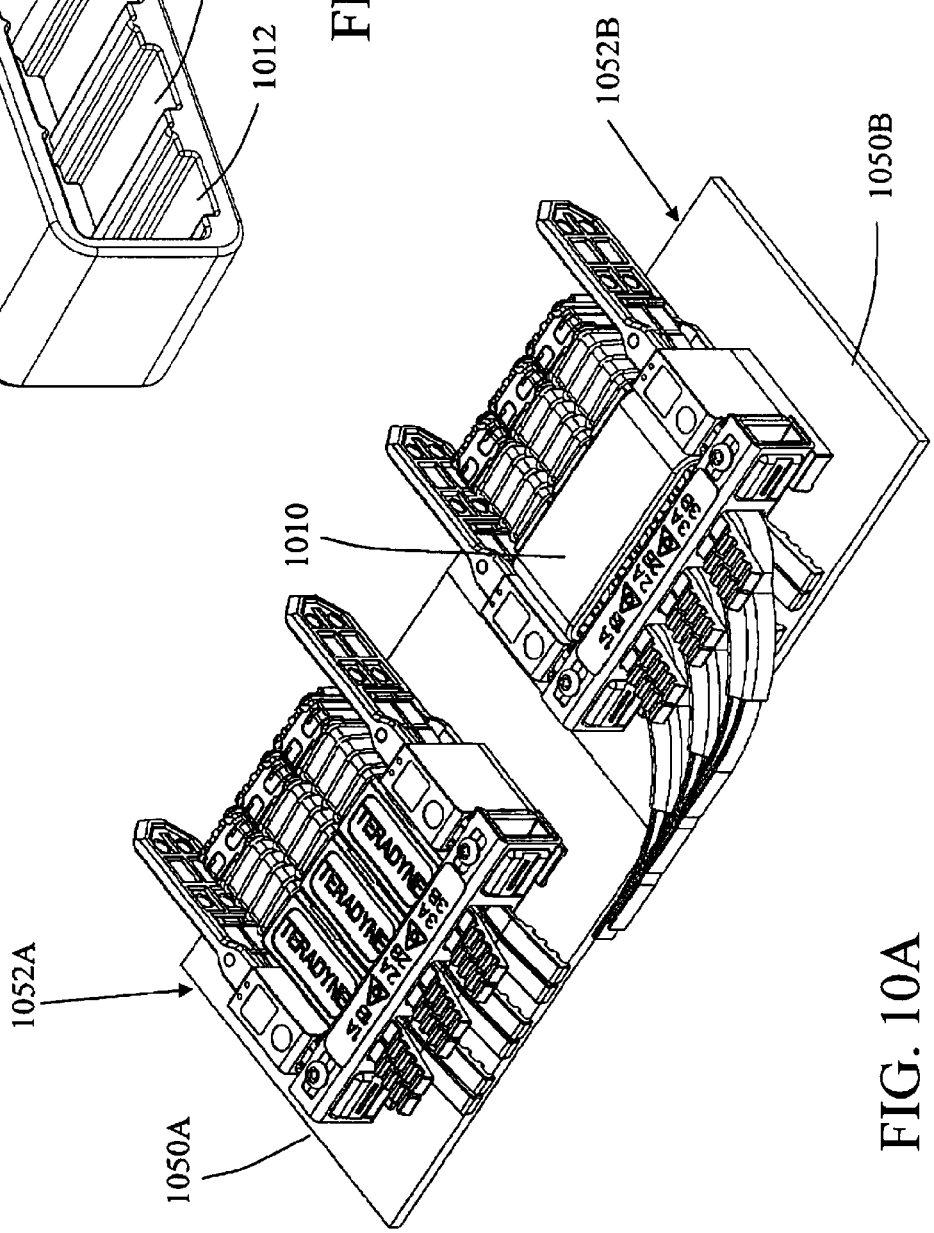
FIG. 10B
FIG. 10A

US 6,986,607 B2

PROTECTIVE COVERS FOR FIBER OPTIC CONNECTOR TO MODULAR PROTECTIVE COVERS FOR FIBER OPTIC CONNECTOR ASSEMBLY

BACKGROUND OF INVENTION

1. Field of Invention

This invention relates generally to interconnection of optical fibers and more specifically to increasing the integrity of the interconnection.

2. Discussion of Related Art

Optical interconnections are known in the art. Optical fibers are used in networking and electronic systems to carry large amounts of data. However, it has traditionally been difficult to make connections between optical fibers. Misalignment of the fibers or contamination of the mating surfaces of the fiber can significantly degrade the performance of the optical data link.

In many applications, optical fibers are joined by a splice, which is intended to be a permanent connection of the fibers. However, there are many applications where it a separable connection between optical fibers is desired. In many applications, it would be desirable if connections to an optical fiber could be made as easily as a connection to a traditional wire cable carrying electrical signals. For these applications, optical connectors have been developed. The optical connectors allow cables to be joined, thus acting as a separable splice for optical fibers to be connected to a circuit board or other assembly. Optical fibers are sometimes used to route signals between circuit boards in an electronic assembly. In these applications, the optical fibers are configured much like a traditional backplane connector in an electronic assembly, allowing boards to be inserted or removed from the assembly.

The connector provides alignment of the optical fibers. Some connectors are also built with shutters or doors that keep dust or other contaminants away from the mating face of the connector. The shutters open before the connectors can be mated.

Optical connectors are often packaged with dust covers. The dust covers are removed before the connector is used. However, even with the presence of a dust cover, it is standard practice in many applications to clean the connector before use.

It would be desirable to provide a connector system that is easy to use, particularly in a backplane configuration, that provides improved cleanliness, and therefore better performance.

SUMMARY OF INVENTION

With the foregoing background in mind, it is an object to provide an improved optical interconnection system that ensures the cleanliness of the fibers yet is easy to use.

The foregoing and other objects are achieved in a system that has, in one embodiment, multiple levels of protection.

According to another embodiment, the system includes a modular dust cover.

According to another embodiment, the protective cover can be inserted or removed by the same tool.

According to another embodiment, the protective cover is self-cleaning.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 10A is a sketch of two daughter cards, with and without a dust gasket;

FIG. 10B is a sketch of the dust gasket of FIG. 10A;

DETAILED DESCRIPTION

Figure 1:
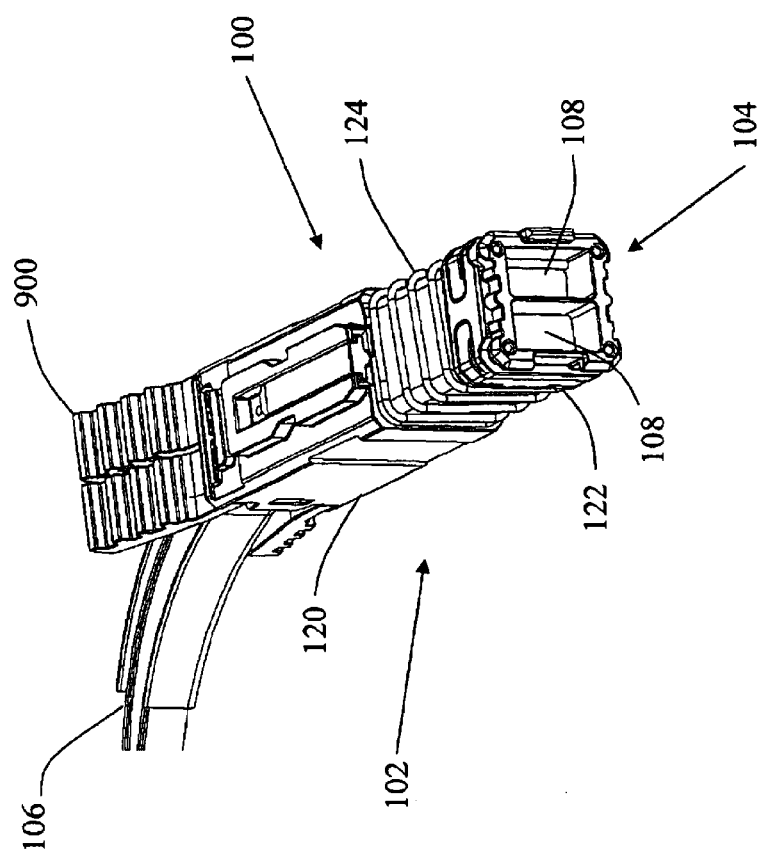
FIG. 1 is a sketch of an optical connector.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 shows an optical connector 100 of the type suitable for making separable connections between optical fibers in a daughter card and a backplane. Optical connector 100 can be part of a connector system, such as is shown in U.S. patent application Ser. No. 10/243,458, filed Sep. 13, 2002, entitled Techniques for Forming Fiber Optic Connections in an Modularized Manner; or U.S. Patent Application 2003/0044127 filed Jul. 16, 2002 entitled Modular Fiber Optic Connection System; all of which are hereby incorporated by reference.

Optical connector 100 includes a housing 102. The housing has a mating face 104 adapted to mate to another optical connector. Optical fibers enter the housing 102 through cables 106 and are exposed for mating through doors 108. As is known in the art, ends of the optical fibers are held in a ferrule that aligns fibers to fibers in a mating connector. A ferrule carrier 900 (see FIG. 9) provides an easy method to insert fibers into a connector housing. In the illustrated embodiment, two ferrule carriers are used.

Housing 102 is made up of a rear portion 120 and a front housing portion 122. Front housing portion 122 slides relative to rear housing portion 120. Spring 124 biases front housing portion 122 forward. Upon mating, front housing portion is pushed rearward, which actuates doors 108. When actuated, doors 108 expose the fiber inside housing 102.

Figure 2B:
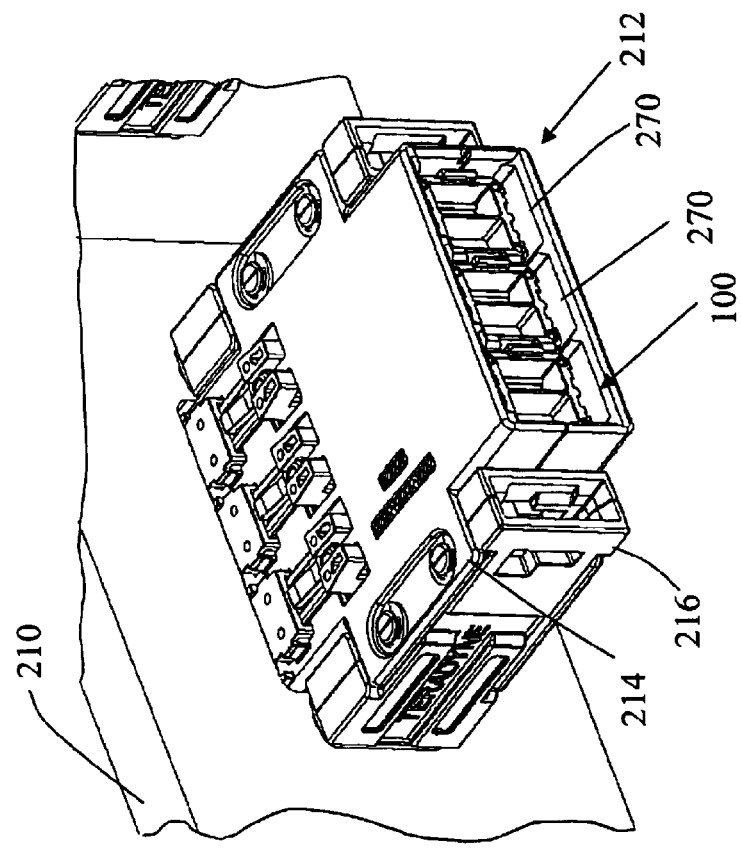
FIG. 2B is a sketch showing the backplane connector portion of the backplane assembly of FIG. 2B.
Figure 2A:
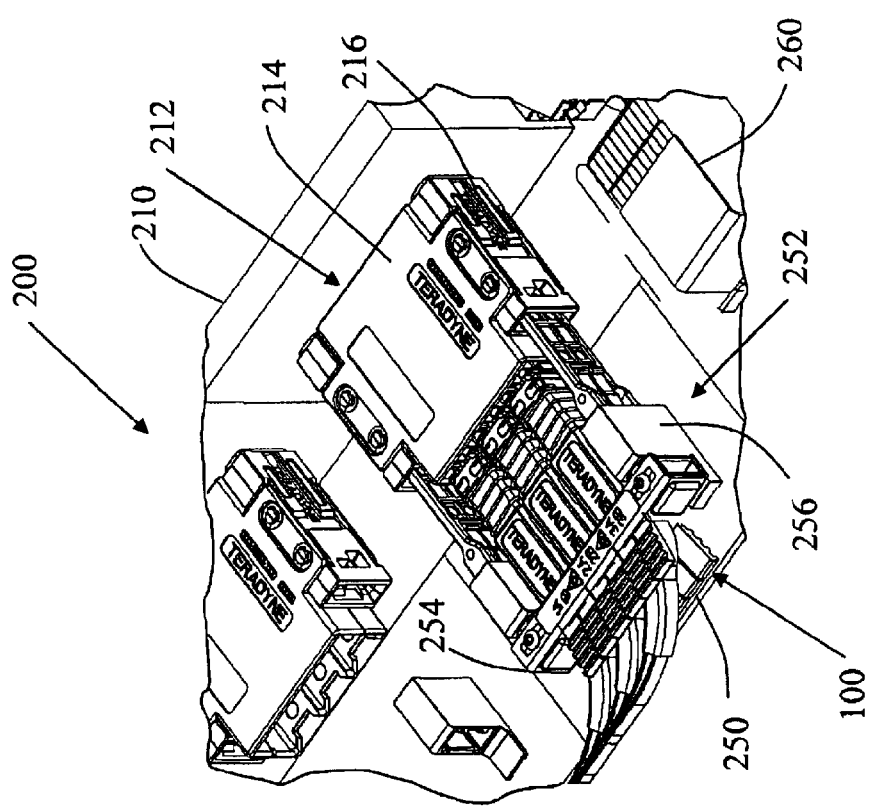
FIG. 2A is a sketch of a backplane assembly using connectors of the type shown in FIG. 1.

In use, optical connector 100 can be used in a connector assembly as shown in FIG. 2A. FIG. 2A shows a backplane assembly 200. The assembly is made up of the backplane 210 and daughter cards 250. Backplane 210 is an optical backplane that routes optical fibers between daughter cards. Backplane 210 can also include electrical signal traces for routing electrical signals between electrical connectors mounted to the daughter cards. Electrical connector 260 is shown for illustration. It should be appreciated that multiple electrical connectors and other conventional components might be included in backplane assembly 250. Multiple daughter cards 250 can connect to the backplane 210. For simplicity only a limited number of daughter cards are shown in FIG. 2A.

Backplane connector assembly 212 is mounted to backplane 210. Backplane connector assembly 212 includes multiple optical fiber connectors such as optical fiber connector 100 in FIG. 1. The optical connectors are held together by a support 214, here shown as a plate. In the preferred embodiment backplane assembly 212 also includes one or more latching modules 216. Latching modules 216 allow a daughter card connector assembly 252 to be latched to a backplane.

In the preferred embodiment, optical connectors 100 are also used to make up the daughter card assembly 252. In the illustrated embodiment, three optical connectors 100 are shown held together by a support 254 to form a daughter card connector assembly 252. Daughter card assembly 252 also includes latch members 256.

In the illustrated embodiment, latches 216 and 256 are of the type shown in the above referenced US patent applications. That latching assembly allows the daughter card connector to latch to the backplane connector. In latching the two pieces together, it allows the daughter card connector to "float" relative to the backplane connector. In this way, the connectors 100 of the daughter card connector assembly can be aligned to similar connectors 100 in backplane connector 212 by features in the connector assemblies. In the illustrated embodiment, the mating faces of optical connectors 100 in backplane connector assembly 212 are within a recessed portion 270 formed by supports 214. The surfaces of recessed portions 270 facing daughter card connector assembly 252 are tapered to gather and align optical connectors 100 of the daughter card connector assembly with those in the backplane connector assembly.

The daughter card latch and the backplane latch cooperate to hold the daughter card connector against with the backplane connector and compress the front faces of both the daughter card and backplane connectors. In this way the doors 108 in each of the backplane and daughter card connectors are opened and the fibers within the housing are aligned and mate.

FIG. 2B shows backplane connector assembly 212 in greater detail. As can be seen, three optical connectors 100 are enclosed by support member 214. It should be appreciated that FIG. 2B shows only a small portion of a backplane assembly. In use, the connector shown in FIG. 2B would be incorporated into a larger assembly that could receive multiple daughter cards 250. In a conventional electronics assembly the daughter cards are aligned on rails (not shown) that bring them into engagement with the backplane. Electrical signals and power are routed through the electronics assembly. In addition, many electronic assemblies include cooling fans that circulate air to dissipate heat generated on the daughter cards. The fans also circulate dust, which could contaminate the mating faces of the optical fibers within connectors 100.

In use, it is intended that the doors 108 not open until the mating faces 104 of connectors 100 are pressed together. In this way, the doors act as a shutter or seal to block dust or other contaminants from reaching the mating faces of the optical fibers within connectors 100. Often, these systems are assembled and shipped to customer sites where they may sit unused for some extended length of time. Therefore, it is possible that even though there are doors present within the system which protect the optics from damage and contamination, large scale particulates can build up over time on the mating surfaces of the connectors if they are not properly protected and/or enclosed.

Figure 3:
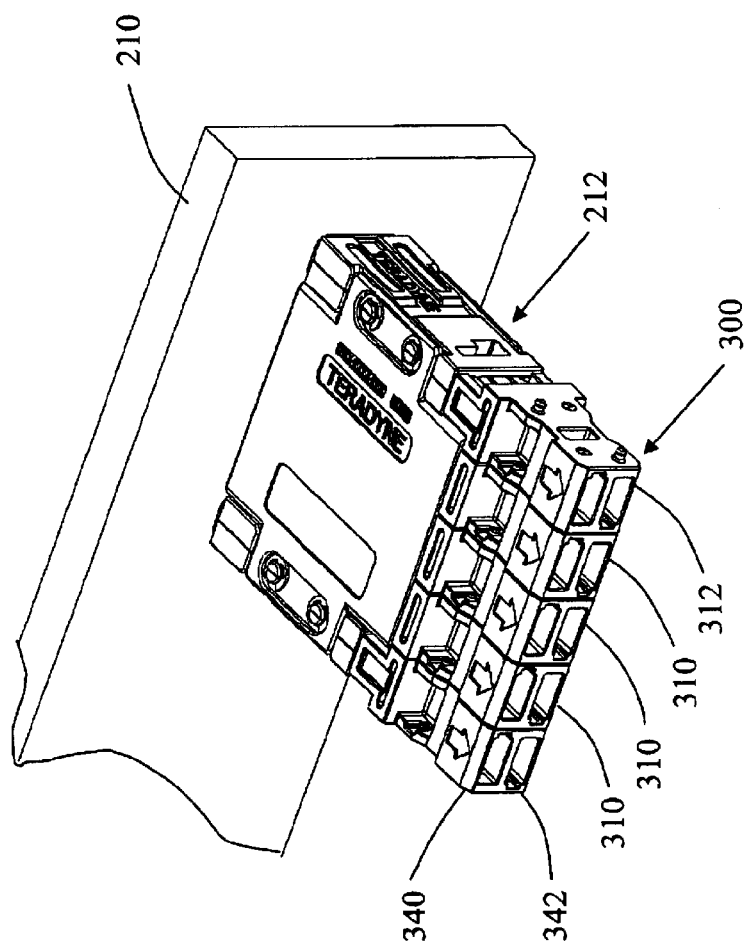
FIG. 3 is a sketch showing the backplane connector of FIG. 2B with a protective cover installed.

FIG. 3 shows a protective cover 300 that can be used with backplane connector assembly 212. Protective cover 300 can be placed on backplane connector assembly 212 to prevent dust or contaminants from reaching the optical connector assemblies 100 before daughter card connectors are mated to them. In the preferred embodiment, protective cover 300 is made up of multiple modules. Here, two types of modules are shown. Modules 310 are intended to mate with one of the optical connectors 100. Modules 312 are designed to engage with the latches 216 of the backplane connector.

Figure 4B:
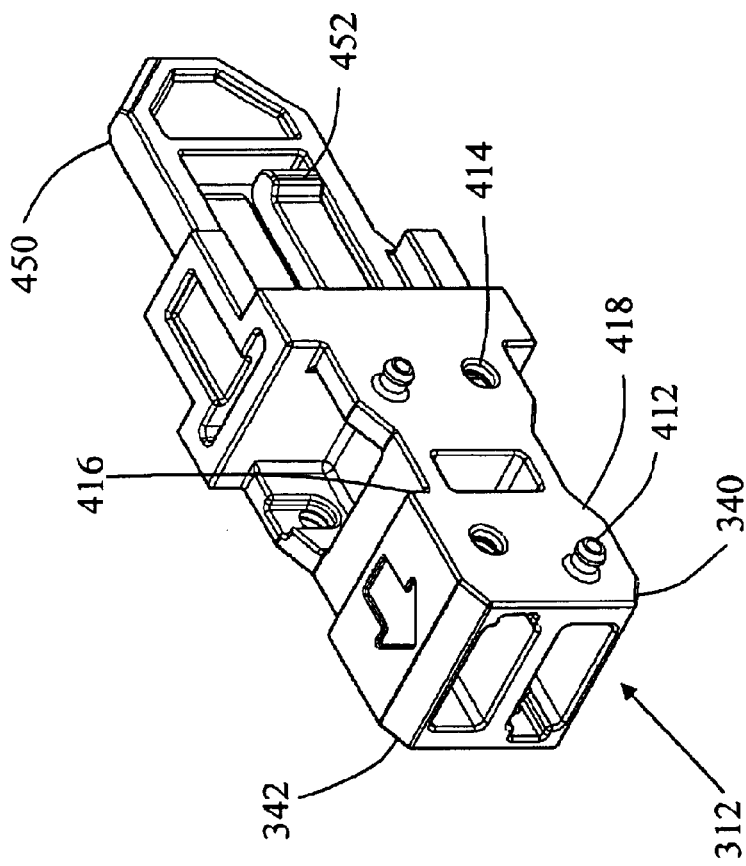
FIGS. 4A and 4B show components of the protective cover of FIG. 3.
Figure 4A:
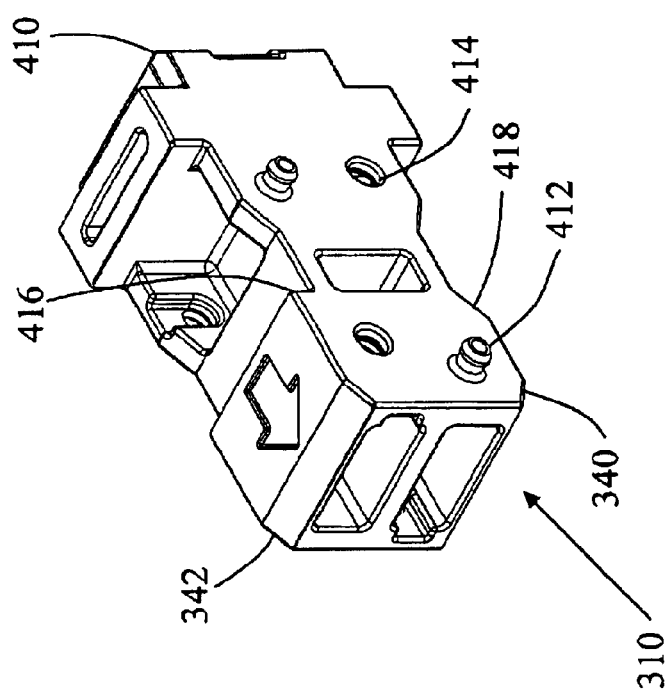

FIGS. 4A and 4B show the modules in greater detail. FIG. 4A shows a module 310 of the type typical for mating to an optical connector 100. Module 310 includes a front face 410. Front face 410 is shaped to fit within the recessed portion 270 of backplane connector assembly 212. In the illustrated embodiment, front face 410 is sized to fit snuggly within the recessed portion 270, holding the modules in by a friction or interference fit. However, other forms of attachment could be used. Module 310 includes features that are intended to secure modules stacked side-by-side to each other. Here, those attachment features are shown as hubs 412 and holes 414. The opposing side of module 310 (not shown) has complimentary features such that a hub 412 will fit into a hole 414 of an adjacent module.

Module 310 includes features to facilitate insertion and removal of protective cover 300. The application of these features will be described in connection with the tool shown in FIG. 6. However, note that the upper surface of module 310 has a projection 416 which presents an abrupt surface. In contrast the lower surface has a projection 418 that presents a ramp or tapered surface. Also, rear surfaces 340 and 342 are tapered to allow a tool to slide over them.

FIG. 4B shows module 312 of the type that can engage with a latch 216 in backplane connector 212. The rear portion of module 312 is similar to the rear portion of module 310. It includes the same pattern of hubs 412 and holes 414. It also includes a projection 416 and a ramp 418. Module 312 includes a blade 450 with latching features 452. As described in the above referenced patent application, a daughter card connector is held to backplane connector assembly 212 through a latching structure that allows float or compliant motion of the connectors as they are being brought together. In the preferred embodiment, the latching features 252 of protective cover module 312 will be compatible with the latching features used in backplane connector assembly 212.

Figure 5:
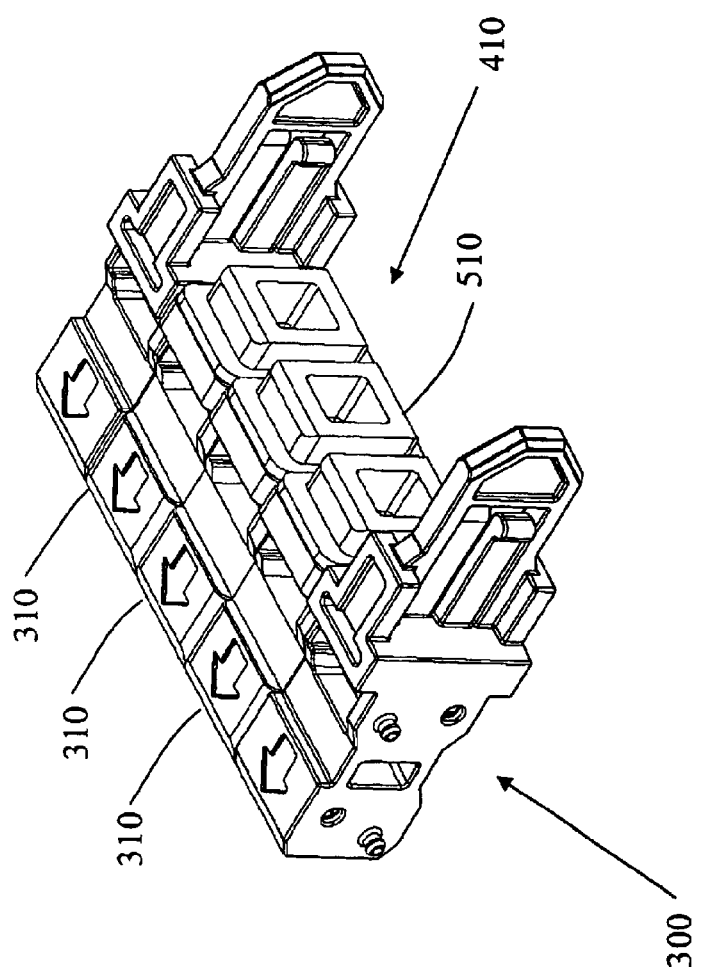
FIG. 5 is a sketch of the protective cover of FIG. 3.

FIG. 5 shows protective cover 300 removed from the backplane connector assembly. As can be seen in FIG. 5, the mating face 410 of protective cover 300 is shaped to mate with backplane connector assembly 212 as shown in FIG. 2B. In the preferred embodiment, protective cover 300 is formed of a compliant material that does not generate dust particles in use. Many plastics are suitable for this application. For example, Vectra E1301.

In the embodiment shown in FIG. 5, the mating face 410 of the modules 310 are made of an adhesive material. This adhesive material aids in keeping the mating faces of the optical fibers clean. In the embodiment shown in FIG. 5, the adhesive material forms a ring 510. Ring 510 is shaped to go around the periphery of recess 270. Preferably, the adhesive material is compliant so that it also increases the sealing between protective cover 300 and the connector assembly.

An advantage of the adhesive material is that when protective cover 300 is removed, dirt or other contaminants near the mating face of connectors will adhere to the adhesive material and also be removed. An example of suitable adhesive material is material sold under the trade name GelPack by Gel Pack, LLP. This material is used in the handling of semiconductor devices. It has the desirable property of not leaving a film or residue behind when it is removed.

Figure 6:
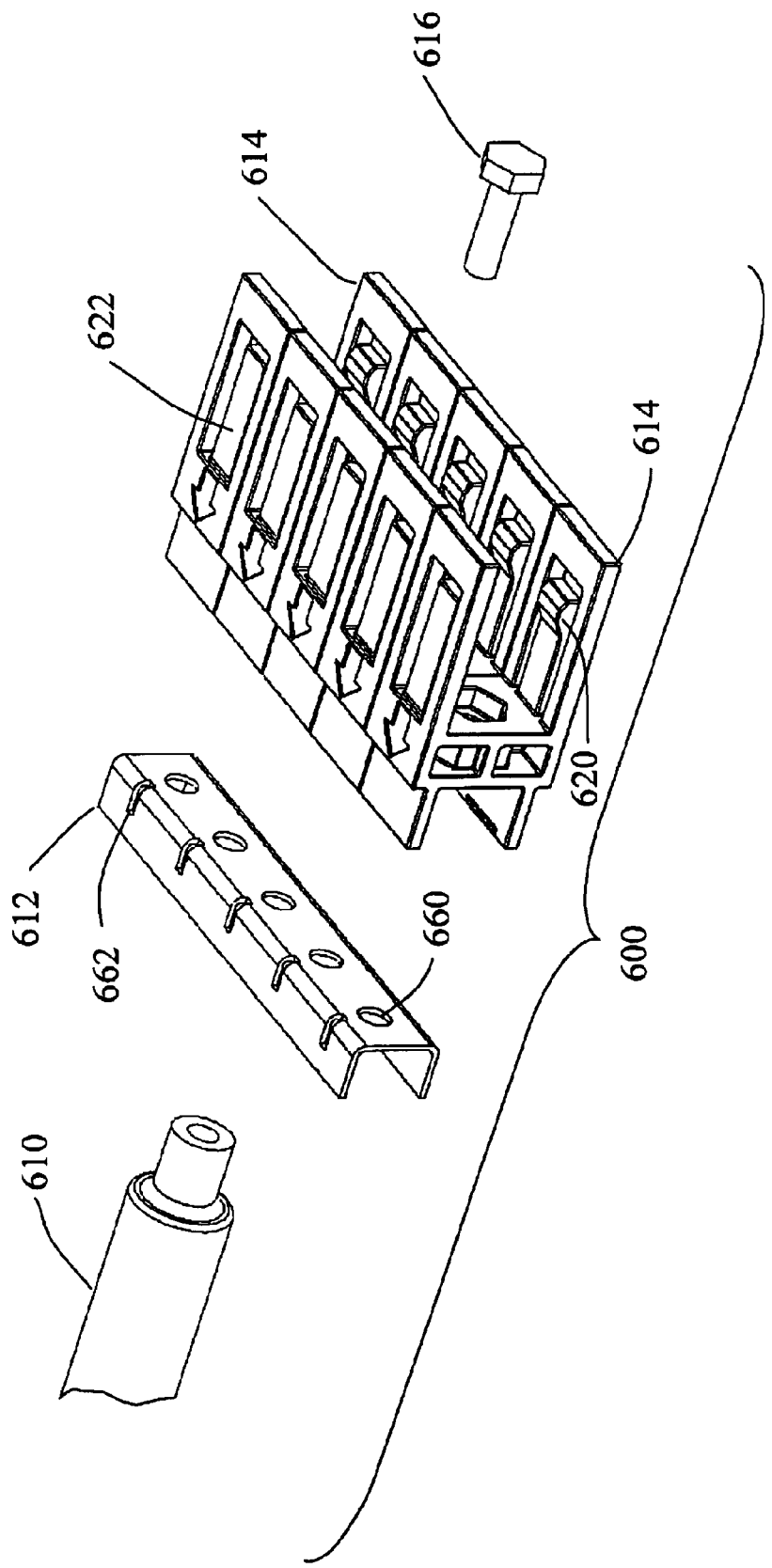
FIG. 6 is a partially exploded view of tool for inserting or removing the protective cover of FIG. 5.

FIG. 6 shows an exploded view of a tool 600 that can be used to insert or remove protective cover 300. Tool 600 preferably includes a handle 610. In use, backplane connector assembly 212 will generally be located at the back portion of an electronic assembly. The backplane connector is accessible only from the front of the assembly, which could be several inches to a couple of feet from the back. Handle 610 must be long enough to reach into the back of the electronic assembly. Preferably handle 610 is made of an insulative material so that it will not cause damage to the electronic assembly by accidentally shorting electrical structures inside the assembly or create the risk of an electric shock to the user.

A stiffener 612 is mounted transverse to handle 610. In the illustrated embodiments, stiffener 612 is made of metal. Multiple tool modules 614 are attached to stiffener 612. In the preferred embodiment, modules 614 include features that engage complimentary features in stiffener 612 such as by a snap fit or other convenient means. Here, slots 662 are shown. Preferably module 614 are made of an insulative material such as plastic. Such a material will serve as an insulative cover for stiffener 612. A material such as plastic will also allow the formation of compliant structures within modules 614. Compliant structures in module 614 can be used to attach the modules to stiffener 612 and also to engage protective cover modules such as 310 and 312.

Stiffener 612 is attached to handle 610. Here a screw 616 is shown. In the illustrated embodiment screw 616 passes through one of the modules 614, through hole 660 in stiffener 612 and engages an opening in handle 610.

Each of the modules 614 includes beams 620 and 622. Here the beams 620 and 622 are formed in opposing faces of the modules. Each of the modules 614 is sized to receive the back end of one of the protective cover modules such as 310 or 312.

Figure 7:
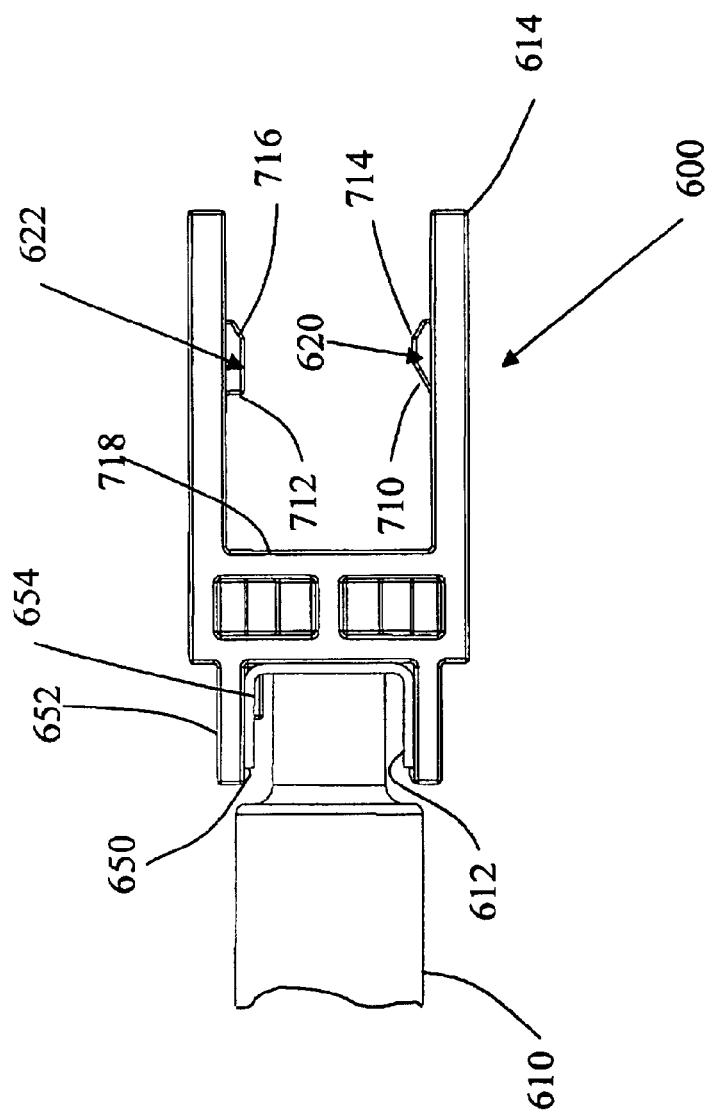
FIG. 7 is a side view of the tool of FIG. 6.

Turning to FIG. 7, additional details of tool 600 can be seen. Module 614 includes a skirt 652 that covers stiffener 612. Skirt 652 includes features that attach module 614 to stiffener 612. Tabs 650 serve to latch module 614 to stiffener 612. Tabs 654 are inserted into slots 652 in stiffener 612.

FIG. 7 shows a side view of the tool 600. In this view it can be seen that beams 620 and 622 include forward portions 714 and 716. Beam 620 has a rearward facing surface 710 in the shape of a ramp. In contrast beam 622 has a rearward facing surface that presents an abrupt projection 712. These features are selected to allow tool 600 to be used to either insert or remove a connector.

When tool 600 is used to insert a connector, tool 600 is oriented so that beam 620 goes against the surface of modules 310 and 312 that include projections 416. Each of the modules 310 and 312 will fit between the opposing sidewalls of one of the modules of the tool 614. In this way the protective cover will be held in the tool with the rear surfaces of the modules can rest against the surface 718 of the tool modules. The tool may then be used to insert the protective cover into a backplane assembly. Sufficient force can be exerted on handle 610 to press the protective cover 300 onto the backplane connector.

The tool 600 may then be removed. Ramped surface 710 of the tool will slide along projection 416 of the modules. Ramped surface 418 of the modules will slide along projections 712. Beams 622 and 620 will be deflected as the tool is removed. The spring force of the beams will generate pressure on the surfaces of modules 310 and 312, causing friction. However, the amount of friction will not be sufficient to unseat the protective cover 300.

When it is desired to remove a protective cover 300, tool 600 is flipped. When used to remove a protective cover, projection 712 of the tool will be aligned with projection 416 of the modules 310 and 312. Ramped surface 710 will be aligned with ramped surface 418 of the modules. As tool 600 is pressed over the protective cover 300, the tapered surfaces 714 and 716 of beams 620 and 622 will ride along tapered surfaces 340 and 342 of modules 310 and 312. Tapered surfaces 340 and 342 will act as camming surfaces, pushing beams 620 and 622 clear of the rear portions of modules 310 and 312, allowing the tool to slide over the rear portions of the modules. However, once tool 600 is pushed far enough forward that projection 712 clears projection 416 of the modules 310 and 312, the spring force of beam 622 will push the projection 712 into engagement with projection 416. In this way, the modules 310 and 312 will become latched to the connector tool 600. When the tool 600 is removed surfaces 712 will press against projection 416 pulling the protective cover out of the backplane connector.

Figure 8B:
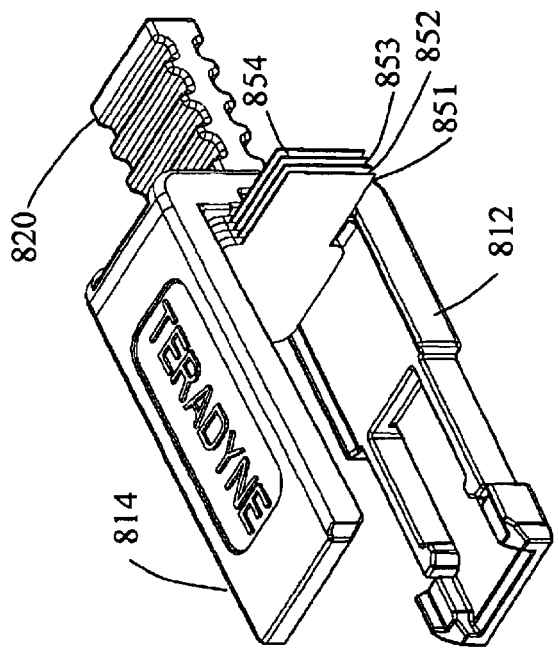
FIG. 8B is a sketch of an alternative embodiment of the protective cover of FIG. 8A.
Figure 8A:
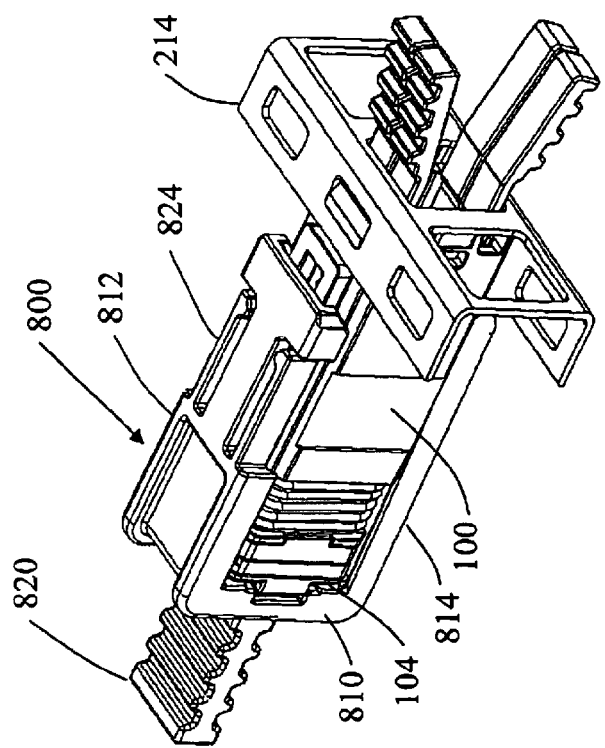
FIG. 8A is a sketch of a protective cover module suitable for use on a daughter card connector mounted on an optical connector.

Turning now to FIG. 8, a protective cover 800 useful in connection with a daughter card connector is shown. FIG. 8A shows one connector 100 attached in a support member 214. As shown in FIG. 2, there would likely be multiple connectors 100 mounted in the support member. For simplicity only one connector is shown.

Protective cover 800 has a face portion 810. Face portion 810 is pressed against the mating face of connector 100.

Protective cover 800 also includes arms 812 and 814. These arms run along the top and bottom of connector 100. In the preferred embodiment, arms 812 and 814 are shaped to leave the sides of connectors 100 free. In this way protective cover 800 can be mounted on connectors 100 aligned side by side in a daughter card connector assembly. Arms 812 and 814 also provide a mechanism to attach protective cover 800 to connector 100. In the embodiment of FIG. 8A, arm 812 includes latching members 824. However, other methods of attachment could be used. For example, protective cover 800 could be attached to a connector 100 through friction or an interference fit.

In the illustrated embodiment, latching members 824 are positioned to engage connector 100 sufficiently back from the mating face of connector 100 that front housing portion 122 is compressed into rear housing portion 120 when the latching members are engaged. This compression ensures that doors 108 are open when protective cover 800 is mounted to the connector 100. As shown in FIG. 8B adhesive pad 851 is mounted on face portion 810. Compressing the front housing portion 122 of connector 100 forces the optical fibers within connector 100 against adhesive pad 851. Adhesive pad 851 is made of a material similar to that used to form adhesive ring 510. Adhesive pad 851 serves to make a tight seal against the optical fiber face and also serves to clean the face of the optical fiber interface and the connector alignment interface when protective cover 800 is removed.

In an alternative embodiment, latching members 824 might engage connector 100 at a point that does not compress from housing 122 into rear housing 120 to open doors 108. In this embodiment, adhesive pad 851 might still be used for cleaning face 104 or might alternatively be omitted entirely.

FIG. 8B shows multiple adhesive pads are included within protective cover 800. Here adhesive pads 851, 852, 853, and 854 are shown. Including multiple adhesive pads allows protective cover 800 to be a self-cleaning protective cover. It allows the protective cover to be used multiple times without risk of contaminating the optical interface of connector 100. Before use, the top most adhesive pad can be peeled off. In this way, a clean adhesive pad is exposed to the mating face 104 of connector 100. A self-cleaning protective cover reduces the need for the protective covers to be stored in a clean environment before use, though it is desirable, even with a self-cleaning cover, to store the cover in a clean environment when not in use.

In the embodiment illustrated in FIG. 8B, having multiple adhesive pads 851 . . . 854 means that the thickness of the wall of cover 800 abutting mating face 104 will change as protective cover 800 is used and pads are removed. Thus the position on the housing of connector 100 where latching members 824 should engage to firmly press face 104 against one of the adhesive pads 851 . . . 854 will change. To ensure proper engagement of cover 800, latching members 824 might not engage a detent or similar structure on connector 100. Rather, they might simply press against a surface of connector 100 to create sufficient force to hold cover 800 to connector 100. However, alternative structures are possible and might be desirable. For example, adhesive pads 851 . . . 854 might be mounted on a member that is spring biased towards face 104 and will provide compliance to compensate for changes in the thickness of the stack of adhesive pads 851 . . . 854.

Protective cover 800 includes a projection 820. Projection 820 serves as a convenient handle or holding place for protective cover 800. In addition, projection 820 serves to reduce damage to an electronic assembly when protective cover 800 is used.

As described above, an electronic assembly often includes rails on which daughter cards slide into engagement with backplane connectors. For many large electronic assemblies, levers or other means are needed to generate sufficient force to seat a daughter card in a backplane assembly. To install a daughter card into an electronic assembly, the daughter card is slid into engagement with the backplane. Before the daughter card comes into contact with the backplane, it slides easily along the rails of the electronic assembly. However, additional force needs to be generated to properly seat the connectors on the daughter card. Thus, when the daughter card gets close to the backplane assembly levers on the daughter card engage features in the electronic assembly. Pushing on the levers generates force that seats the daughter card into the backplane assembly.

The levers can generate significant force, which might be large enough to damage the electronic assembly if an obstruction, such as a protective cover, interferes with the daughter card properly seating in the electronic assembly.

Projection 820 is designed to be long enough that the daughter card assembly will be held away from the backplane assembly when protective covers 800 are mounted in the daughter card assembly. Daughter cards should be held by projections 820 sufficiently far from the backplane assembly that the levers on the daughter cards cannot engage. In this way, an operator cannot use the levers to generate significant force on the daughter card assembly while protective covers 800 are in place, thereby reducing risk of damage to the electronic assembly.

Figure 9:
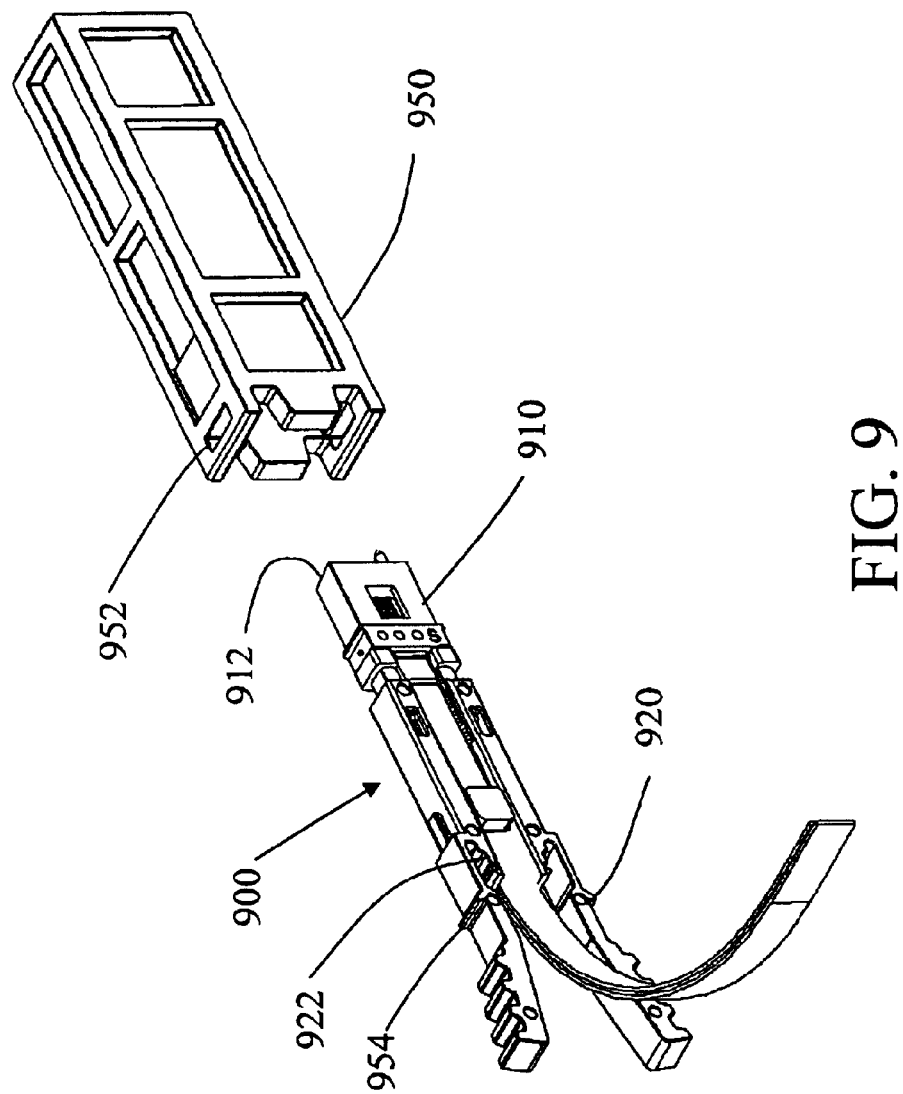
FIG. 9 is a sketch of a ferrule carrier suitable for use in the connector of FIG. 1 and a protective cover.

Turning now to FIG. 9, a ferrule carrier 900 is shown. Ferrule carrier 900 includes a ferrule 910. The forward face 912 of ferrule 910 provides final positioning of the optical fibers in the connector. When ferrule carrier 900 is installed in a connector 100, the mating face 912 a ferrule 910 will be protected by the doors 108 of connector 100 and by dust cap 300 or 800. As shown in FIG. 1, the rear portion of ferrule carrier 900 extends from the rear portion of housing 102 of the connector. The rear portion of ferrule carrier 900 is shaped to form labyrinth seal 920. Also, the rear portion of the ferrule carrier is designed to accommodate a rectangular seal which attaches to the ribbon and sits within the rear window. By using such a seal, the rear portion of the connector can be more securely protected from dust. In this way, the amount of dust or other contaminants reaching the mating face 912 is reduced. In this embodiment, projections 922 around optical fiber bundle 106 form the labyrinth seal. Tabs 954 are designed to engage the rear portions of housing 102 of connector 100.

However, before ferrule carrier 900 is inserted into a connector housing 102, the mating face 912 needs to be protected. Protective cover 950 is shown for this purpose. Ferrule carrier 900 can be inserted into protective cover 950 in much the same way that ferrule carrier 900 would be inserted into a connector 100 in use. Tabs 954 engage slots 952 in protective cover 950. Once engaged, the labyrinth seal 920 will seal the ferrule 910 inside protective cover 950. In this way the mating face 912 can be protected and kept clean until ferrule carrier 900 is ready for use in a connector 100.

For additional protection, protective cover 950 can include adhesive material similar to pads 851 through 854. If used, adhesive material would be positioned so that mating face 912 would press into the adhesive material when ferrule carrier 900 is latched in protective cover 950.

As described above, the doors 108 of connectors 100 stay closed until backplane and a daughter card connector are pressed against each other. Because the connectors must be pressed together to open the doors 108, a seal is naturally formed between the connectors whenever the doors 108 are opened. For many applications, this seal will be adequate to prevent dust or other contaminants from reaching the mating surfaces of the connectors. However, in some instances, it will be desirable to increase the effectiveness of this seal. FIG. 10A shows two daughter cards 1050A and 1050B. Daughter card connector assembly 1052A is as described above. Connector 1052B is fitted with a gasket 1010. Gasket 1010 improves the seal between daughter card connector 1052B and a backplane connector assembly when mated. This gasket would be desirable for systems which are in harsh environments and are likely to be in place for great lengths of time.

Gasket 1010 is preferably made from a compressible silicone rubber type material. As shown in figure 1010B, gasket 1010 includes channels 1012. Each channel 1012 is adapted to receive a rear housing portion 120 of one of the connectors 100. When daughter card connector assembly 1052B is pressed against a backplane connector such as is shown in FIG. 2B, gasket 1010 will fill the recessed portions 270. Preferably, gasket 1010 will be sized so that it is slightly compressed when daughter card connector 1052B mates with the backplane connector. In this way, gasket 1010 provides additional sealing around the mating faces of the connectors. FIG. 10B shows gasket 1010 made as a single piece that goes around all of the connectors 100 in the daughter card connector assembly 1052B. It is possible that gasket 1010 could be made as multiple individual gaskets each one going around an individual connector 100.

Figure 11:
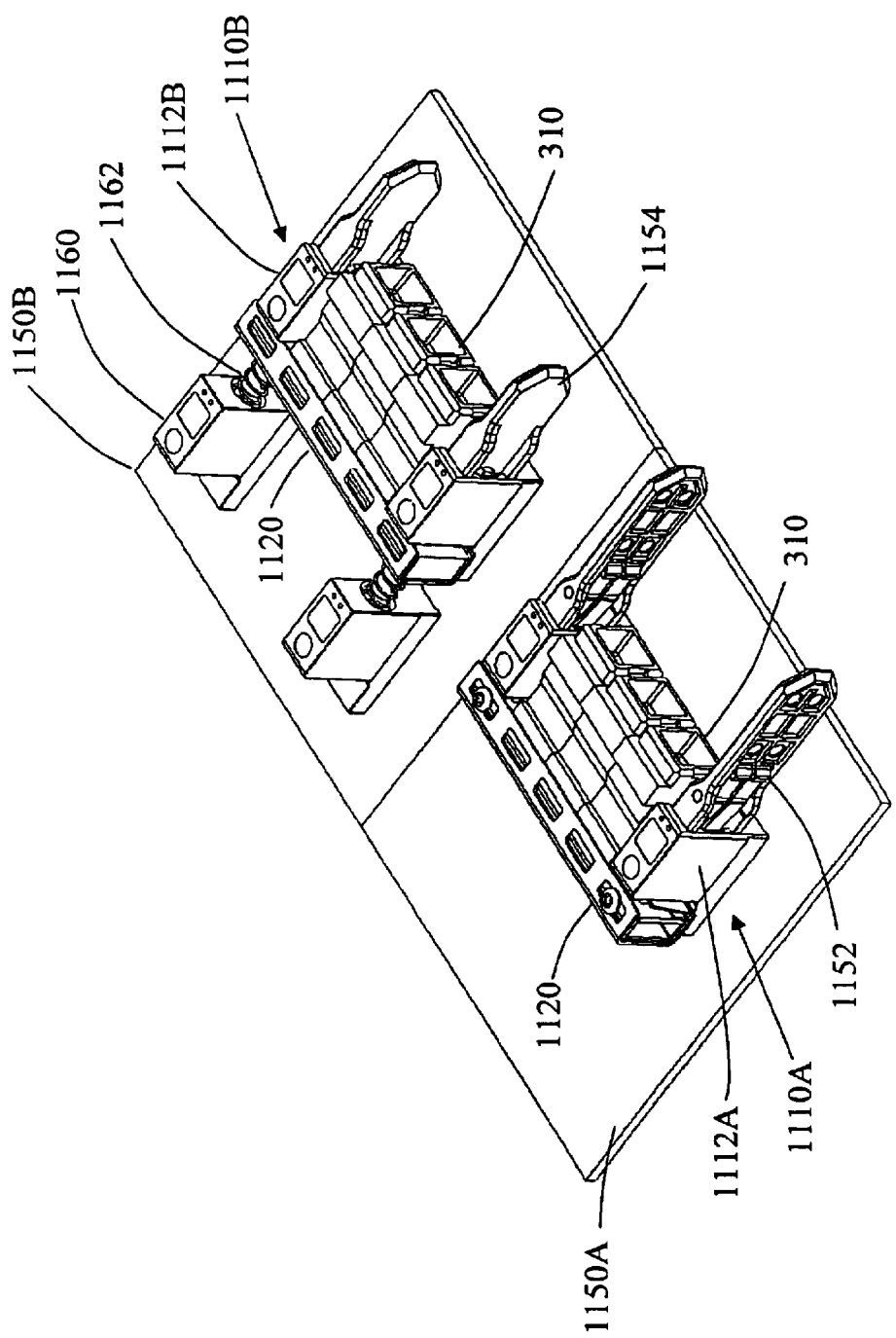
FIG. 11 is a sketch showing protective covers mounted on a dummy board.

As was described above, protective covers 300 were installed on backplane connectors 212 using a tool. However, other installation mechanisms are possible and might be desirable in some applications. It is possible that protective covers could be mounted to dummy daughter cards such as 1150A and 1150B shown in FIG. 11. In this way, the protective caps would be installed and removed in the same way that a daughter card would be installed and removed in an electronics assembly. This also prevents accidental insertion of a card onto a connector with dust covers and it also prevents protective cover components from being lost.

As described in the above-referenced patent applications, it is necessary to provide float for the daughter card connector assembly so that it can be properly aligned with the backplaned connector. Dummy daughter card 1150A includes latching modules 1112A which are similar to the latching modules used in an actual daughter card connector. Latching modules 1112A include latching features 1152 which provide the float when the daughter card connector is mated to the backplane connector. As with actual connector modules, the protective cover modules are mounted to a stiffener 1120.

Dummy daughter card 1150B is shown with a different mechanism to provide float. In this embodiment, latching modules 1112B have much simpler latching features. Latching modules 1112B include simple blades 1154 for engaging the latching modules in the backplane connector. Float, or compliance, is provided by the attachment mechanism to dummy board 1150B. Mounting modules 1160 are secured to the board 1150B. A compliant connection 1162 holds protective cover 1110B to the mounting blocks 1160. Here the compliant connection 1162 is shown as a spring.

The above described connector system provides several advantages. One advantage is that it provides multiple levels of protection. Even when a shutter is used to protect the fibers inside a connector, additional protection is easily provided.

The system is also easy to use. The protective covers are modular, matching the modularity of the connector system. Protective covers can be easily created for any type system.

Ease of use is also enhanced by self cleaning aspects of the connector. FIG. 8B illustrates the principle that multiple adhesive structures might be used. Even when only a single adhesive pad is used, the pad might be covered by a protective sheet that is removed before use to reveal a clean surface. This feature reduces the need to store the protective cover in a clean environment before use.

Additionally, using adhesive structures in the covers to remove dust or contaminants allows the protective covers to also be used for minor cleaning of a dirty connector end face. For example, tool 600 might be used to press a protective cover with adhesive pads onto a backplane connector assembly. Tool 600 might be simply shipped to remove the protective cover, leaving behind a cleaned surface, ready for a daughter card to be installed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An optical connector assembly comprising:
   a) an optical connector comprising a plurality of connector elements, each of the connector elements having a mating face with an opening therein; and
   b) a dust cover comprising a plurality of like modules coupled together, each of the modules having a portion covering the opening of a front mating face of a connector element.

2. The optical connector assembly of claim 1 wherein the dust cover comprises at least one second type module, different from said plurality of like modules, the second type module having features thereon for latching to the optical connector.

3. The optical connector assembly of claim 1 wherein each of the plurality of connector elements includes a shutter.

4. The optical connector assembly of claim 1 wherein each of the modules has opposing sides with complementary engagement features formed on the opposing sides.

5. The optical connector assembly of claim 4 wherein the engagement features comprise holes and projections with the projections of one module aligned to engage holes in an adjacent module when the modules are placed side-by-side.

6. The optical connector assembly of claim 1 wherein the optical connector is a backplane connector in an electronic assembly.

7. The optical connector assembly of claim 1 wherein the optical connector additionally comprises a support member to which the connector elements are attached and each of the dust cover modules forms an interference fit with the support member.

8. The optical connector assembly of claim 1 wherein the optical connector is mounted in the backplane of an electronics system of the type that receives a plurality of daughter cards of predetermined size characteristics, the assembly further comprising a dummy board having the size characteristics of a daughter board, wherein the dust cover is mounted to the dummy board.

9. The optical connector assembly of claim 8 wherein the dust cover is mounted to the dummy board through a compliant mount.

10. The optical connector assembly of claim 1 additionally comprising a gasket encircling the plurality of connector elements.

11. An optical connector assembly comprising:
    a) an optical connector comprising a plurality of connector elements aligned side-by-side, each of the connector elements having a housing with a mating face having an opening therein; and
    b) a dust cover comprising a plurality of like modules, each of the modules having a cover portion covering the opening of a front mating face of a connector element, each of the like modules having arms extending from the cover portion and engaging the housing.

12. The optical connector assembly of claim 11 wherein the modules are C-shaped.

13. The optical connector assembly of claim 11 wherein the housing of each module is compressible and compressing the housing actuates a shutter that covers the mating end of an optical fiber and the arms engage the housing when the housing is in a compressed state.

14. The optical connector assembly of claim 13 wherein the dust cover additionally comprises an adhesive member on the cover portion.

15. The optical connector assembly of claim 14 wherein the adhesive member comprises a plurality of separable adhesive pads.

16. The optical connector assembly of claim 15 wherein each of the plurality of adhesive members has a tab extending therefrom, providing a mechanism to remove a pad.

17. The optical connector assembly of claim 11 additionally comprising a projection from the cover portion extending away from the front mating face.

18. The optical connector assembly of claim 17 wherein the optical connector assembly is mounted to a daughter card for an electronic assembly, the electronic assembly includes a force generating apparatus that can be actuated to seat a daughter card in a backplane and the projection holds the daughter card sufficiently far from the backplane that it does not engage the force generating apparatus.

19. The optical connector assembly of claim 11 wherein each of the cover modules latches to the connector housing.

20. The optical connector assembly of claim 11 wherein each of the modules engages the connector housing with a friction fit.

21. An optical connector assembly comprising:
   a) an optical connector comprising a plurality of connector elements, each of the connector elements having a mating face with an opening therein;
   b) a cover comprising a plurality of modules coupled together, each of the modules having a portion covering the opening of a front mating face of a connector element; and
   c) an adhesive substance positioned between the optical connector and the cover.

22. The optical connector assembly of claim 21 wherein the adhesive substance comprises at least one gel-pack.

23. The optical connector assembly of claim 22 wherein the adhesive substance comprises a plurality of gel-packs, each of the gel-packs disposed between one of the connector elements and one of modules.

24. The optical connector assembly of claim 21 wherein each of the connector elements has a compressible face and a shutter actuated by compression of the compressible face, and wherein the cover comprises a latching member whereby the connector element may be latched to the cover with the compressible face against the adhesive substance.

25. The optical connector assembly of claim 24 additionally comprising a gasket encircling the connector element.

26. The optical connector of claim 21 wherein each optical connector element comprises a ferrule.

27. A method of using an optical connector, comprising:
   a) providing an optical connector as in claim 26;
   b) pressing the cover towards the optical connector until the adhesive substance engages the ferrule;
   c) removing the cover; and
   d) coupling the optical connector to a second optical connector.

28. The optical connector of claim 21 wherein the adhesive substance is a ring.

29. The optical connector of claim 21 wherein the adhesive substance is a pad.

30. The optical connector of claim 21 wherein the adhesive substance comprises a plurality of separable, stacked adhesive members.

31. The optical connector of claim 30 wherein each of the adhesive members has a backing including a non-adhesive tab.

32. The optical connector of claim 31 wherein each optical connector element comprises at least one fiber having a mating end exposed in the opening of the mating face and the adhesive substance contacts the mating end of the at least one optical fiber.

33. A method of using an optical connector comprising:
   a) providing an optical connector as in claim 32;
   b) removing one of the separable members to expose a clean surface of at least one separable, stacked adhesive member; and
   b) installing the cover on the connector with the clean surface contacting the mating end of the optical fiber.

* * * * *